United States Patent [19]

Minkler

[11] Patent Number: 4,910,834

[45] Date of Patent: Mar. 27, 1990

[54] ROPE TIE-DOWN LOOP

[76] Inventor: Donald W. Minkler, 3509 Badillo Rd, San Marcos, Calif. 92069

[21] Appl. No.: 363,130

[22] Filed: Jun. 8, 1989

[51] Int. Cl.$^4$ ............................................. F16G 11/10
[52] U.S. Cl. .................................. 24/129 R; 24/129 A
[58] Field of Search ............. 24/129 R, 129 B, 129 A, 24/339; 114/218

[56] References Cited

U.S. PATENT DOCUMENTS

| | | | |
|---|---|---|---|
| 216,700 | 6/1879 | Reynolds et al. | 24/129 R |
| 468,819 | 2/1892 | McAnarney | 24/129 R |
| 796,218 | 8/1905 | Jones | 24/129 R |
| 808,970 | 1/1906 | Clark . | |
| 931,754 | 8/1909 | Greenleaf . | |
| 1,205,496 | 11/1916 | Whitehead . | |
| 1,565,041 | 12/1925 | Arney | 24/129 R |
| 1,713,106 | 5/1929 | Ulfers . | |
| 2,151,664 | 3/1939 | Redfield | 24/129 |
| 2,174,192 | 9/1939 | Meighan | 24/129 R |
| 2,441,336 | 5/1948 | Sova | 24/129 R |
| 3,678,543 | 7/1972 | Hobbs | 24/230 |
| 3,930,288 | 1/1976 | Black et al. | 24/129 |
| 4,214,350 | 7/1980 | Copelan | 24/129 R |
| 4,774,742 | 10/1988 | Johnson | 24/129 R |

*Primary Examiner*—Victor N. Sakran
*Attorney, Agent, or Firm*—Baker, Maxham, Jester & Meador

[57] ABSTRACT

A quick connect adjusting loop for a cargo tie-down rope comprises a body of substantially rigid, high strength material having a first portion forming a loop through which a loop of a tie-down rope extends and a second portion forming slip lock adjacent the loop for releasably gripping the rope.

13 Claims, 1 Drawing Sheet

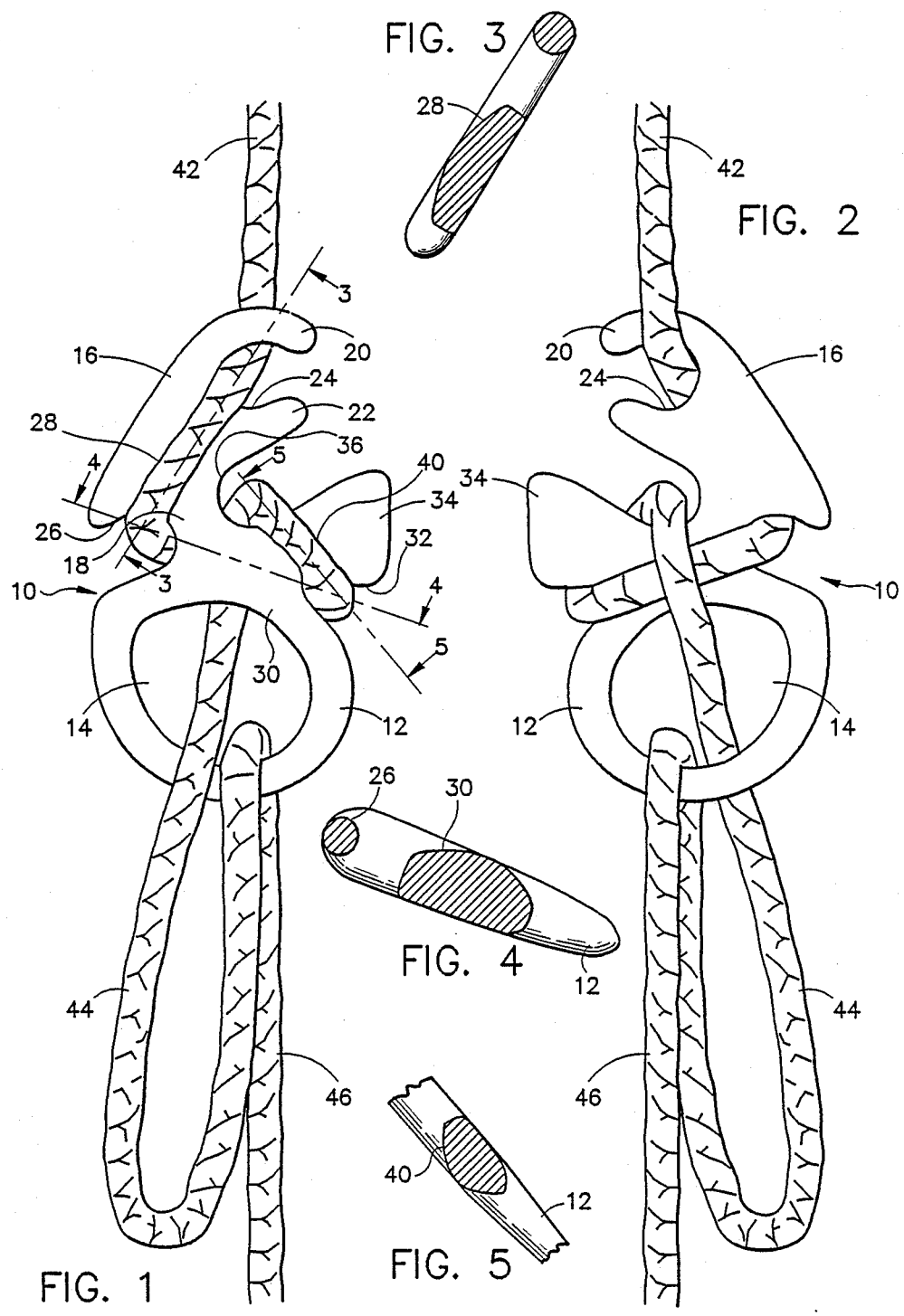

ROPE TIE-DOWN LOOP

BACKGROUND OF THE INVENTION

The present invention relates to rope tie-down devices and pertains particularly to a trucker's knot.

Truckers traditionally use one or more ropes to tie down the load on their truck bed. The prior art approach is for the trucker to tie one end of the line or rope to one side of the truck bed, toss the line over the load, and form a first or fixed loop in the line near the other end of the rope, so that he can extend a variable loop of the line through the first loop and hook it over a hook or the like on the side of the truck bed. The trucker then pulls on the tail end of the rope to snug it tight across the load.

The major problem with this approach is that it takes time to form the knot. Another problem is that if the knot is placed at the wrong position, it must be removed and replaced. This can be time consuming and frustrating. The present invention eliminates the time and frustration normally involved in forming the trucker's knot in the proper position in the line.

SUMMARY AND OBJECTS OF THE INVENTION

It is the primary object of the present invention to provide an improved trucker's knot.

In accordance with a primary aspect of the invention a trucker's knot for use on a cargo tie-down rope comprises a body of substantially rigid, high strength material having a loop formed therein and a slip lock adjacent said loop.

BRIEF DESCRIPTION OF THE DRAWING

The above and other objects and advantages of the present invention will become apparent from the following description when read in conjunction with the accompanying drawing wherein:

FIG. 1 is a front elevation view illustrating a preferred of the invention in use;

FiG. 2 is a rear elevation view of the embodiment of FIG. 1;

FIG. 3 is a view taken on line 3—3 of FIG. 1;

FIG. 4 is a view taken on line 4—4 of FIG. 1; and

FIG. 5 is a view taken on line 5—5 of FIG. 1.

DETAILED DESCRIPTION OF A PREFERRED EMBODIMENT

Referring to FIG. 1 of the drawings, there is illustrated an exemplary embodiment of a mechanical trucker's knot in accordance with the invention, designated generally by the numeral 10, shown in operative position on a tie-down rope. The mechanical trucker's knot or rope loop, in accordance with the invention, comprises a body of substantially rigid, high strength material, forming a ring or loop 12 at the lower end thereof. The body of the device may be formed of any suitable material, such as a durable high strength plastic, a metal, wood or any other suitable high strength substantially rigid material. The ring or loop defines or forms hole or loop 14 through which a rope is to pass to form a variable or sliding loop.

The overall body member 10 comprises a combination of a ring or loop and a slip lock extending upward from the loop. The overall body is asymmetric about a central axis, forming an extension of the axis of the upper portion of a tensioned rope or line to which the device is attached.

The overall device, as viewed in FIG. 1, has a top, bottom, front and back, and left and right sides. As described from this orientation, the hole or opening 14 of the loop 12 is on the order of at least twice and preferably on the order of several times the diameter of the rope or line to which the device is to be attached, and is positioned on the vertical center or load axis. This vertical center line or load axis will generally coincide or align with the axis of the line portion 42 under load or tension.

The slip lock portion of the device comprises a first arm 16, extending to the upper left of the main body and forming a somewhat cleat like structure of an arm 18, and extending at an angle of on the order of about thirtydegrees from the loop 12 upward toward the vertical axis of the device. The ar 16 includes an upper end, having a curved hook portion 20 that hooks over and across the axis of the upper portion of a line or rope 42 to be hooked therein positioning the body relative thereto. A lower hook or finger portion 22 cooperatives with the upper hook or finger extension 20, to form a generally C-shaped opening through which the line extends with a notch like section or opening 24 which limits the line or rope to a pre-determined maximum diameter. The opposite end of the arm or member 16 is formed with a notch 26 at the juncture of the lower arm portion 18 and loop 12. This notch through which the rope or line extends to pass across the back of the device supports the line for its change in direction, as will be described.

A guide way 28 (FIG. 3) extends from the hook and notch portion 24 at the upper end of the device down to the lower left hand notch 26. A guide way 30 (FIG. 4) extends across the back of the device and over to a notch 32, at the right hand side of the device formed by the outer extension of an arm 34. The upper edge of arm 34 cooperatives with a lower edge of the lower finger portion of arm 16 to form another notch 36, through which a line extends back to the back of the device, where it then loops through the loop 12. These guide surfaces and notches also function as frictional gripping surfaces to grip the line or rope to prevent slippage of the device on the line or rope when the line is tight. This arrangement provides three gripping surfaces, excluding the notches. The loop over the finger 34 loops the rope or line over a portion of itself and thereby provides additional gripping.

As previously explained, the present device is used as a trucker's knot, and may be selectively positioned very easily and quickly at any position along a tie-down rope. As disclosed in FIG. 1, a tie-down rope, an intermediate portion of which is shown, includes an upper portion 42, which is a portion that would normally extend over the load. The opposite or other end of the rope is secured to an opposite side of the bed of a truck, with the near side as illustrated, then being provided with the loop device of the present invention. The loop device is selectively positioned and hooked into place with the hook 20, 22 first extending onto the rope or line 42, with the line then passed along groove or friction surface 28, and through notch 26. The rope then extends across the back or behind the device along groove or friction surface 30, into notch 32 and then up and across groove or surface 40 and into notch 36. A loop 44 is then formed in the rope and extended through the loop 12. This loop 44 is looped over a hook or cleat on the trunk bed, with the tail end of the rope or line 46 extending down to use to draw the line tight and tail it off.

The loop 44 is pulled down and hooked to or looped around a hook or the like on the near side of the truck bed. The tail end 46 is then used to draw the line tight across the load, with the loop 12 acting somewhat in the fashion of a pulley. When the line is tight, the tail end of the line portion 46 is tied off to a suitable cleat or the like on the truck bed.

Thus, it is seen from the above described structure and operation that there is provided an improved mechanical trucker's knot, which may be quickly and easily attached to a tie-down line or rope and can be quickly and easily moved to selected positions along a section of the rope or line.

While I have illustrated and described my invention by means of specific embodiments, it is to be understood that numerous changes and modifications may be made therein without departing from the spirit and scope of the invention as defined in the appended claims.

I claim:

1. A trucker's loop device for use on a cargo tie-down rope comprising:
   a body of substantially rigid, high strength material having a top, bottom, front, back, left and right sides relative to a vertical axis, a loop formed therein at said bottom and a slip lock at said top adjacent said loop comprising a first arm extending at a first angle to said loop and including a first notch and a second notch for receiving a rope of a predetermined maximum diameter, a second arm extending at a second angle from said loop and including a third notch for said rope, and loop is on the order of at least twice said predetermined maximum diameter in order to accommodate a sliding loop in a rope of said maximum diameter.

2. A trucker's loop device according to claim 1 wherein:
   said first arm has an outer end and a hook at said outer end forming a portion of said first notch.

3. A trucker's loop device according to claim 2 wherein:
   said first arm extends from the left side of said body and said hook overlies said vertical axis above said body.

4. A trucker's loop device according to claim 3 wherein:
   said first arm and said loop forms a notch therebetween at the left side of said body.

5. A trucker's loop device according to claim 4 wherein:
   said first arm has a first portion that extends at an angle to the upper left of said loop and a second portion extending from said first portion to said hook at said vertical axis.

6. A trucker's loop device according to claim 5 wherein:
   said second arm extends from said loop at the upper right outward to the right from said axis.

7. A trucker's loop device according to claim 6 wherein:
   said first arm includes a guide way extend along the length of said second portion thereof; and
   said body includes a guide way that extends between the juncture of said first arm and said second arm with said loop.

8. A quick connect adjusting loop for a cargo tie-down rope comprising:
   a body of substantially rigid, high strength material having a top, bottom, front, back, left and right sides relative to a vertical axis coinciding with the longitudinal axis of a rope associated therewith and is asymmetrical relative to said vertical axis, a first portion forming a loop and a second portion forming slip lock adjacent and above said loop, said slip lock comprises a first arm extending at a first angle to said loop and including a hook on an outer end forming a first notch for receiving a top of a predetermined maximum diameter and a second notch at the other end, a second arm extending at a second angle from said loop and including a third notch for receiving said rope, and said loop is at least twice said maximum diameter for receiving a sliding loop in a rope of said maximum diameter.

9. A trucker's loop according to claim 8 wherein:
   said first arm extends from the left side of said body and said hook overlies said vertical axis above said body; and
   said first arm and said loop forms a notch therebetween at the left side of said body.

10. A trucker's loop according to claim 9 wherein:
    said first arm has a first portion that extends at an angle to the upper left of said loop and a second portion extending from said first portion to said hook at said vertical axis, and includes a guide way extend along the length of said second portion thereof;
    said second arm extends from said loop at the upper right outward to the right from said axis; and
    said body includes a guide way that extends between the juncture of said first arm and said second arm.

11. A quick connect adjusting loop for a cargo tie-down rope comprising:
    a body of substantially rigid, high strength material having a first portion forming a loop for receiving a sliding loop of a tie-down rope and a second portion forming slip lock adjacent said loop for releasably positioning said body intermediate the ends of a tie-down rope for enabling the formation of a sliding loop therein for cooperative engagement with said loop;
    said body has a top, bottom, front, back, left and right sides relative to a vertical axis coinciding with the longitudinal axis of a rope associated therewith and is asymmetrical relative to said vertical axis;
    said slip lock comprises a first arm having an inner end and an outer end extending at a first angle to said loop and including a hook on the outer end and notch at the inner end for receiving a rope, said first arm extends from the left side of said body and said hook overlies said vertical axis above said body for engaging a tie-down rope and positioning said body relative thereto, said first arm and said ring forms a notch therebetween at the left side of said body, and a second arm extending at a second angle from said ring and including a second notch for receiving said rope.

12. A quick connect adjusting loop for a cargo tie-down rope comprising:
    a body of substantially rigid, high strength material having a first portion forming a loop and a second portion forming slip lock adjacent said loop;
    said body has a top, bottom, front, back, left and right sides relative to a vertical axis coinciding with the longitudinal axis of a rope associated therewith and is asymmetrical relative to said vertical axis;

said slip lock comprises a first arm having an inner end and an outer end extending at a first angle to said loop and including a hook on the outer end and notch at the inner end for receiving a rope, said first arm extends from the left side of said body and said hook overlies said vertical axis above said body, said first arm and said ring forms a notch therebetween at the left side of said body, and a second arm extending at a second angle from said ring and including a second notch for receiving said rope;

said first arm has a first portion that extends at an angle to the upper left of said ring and a second portion extending from said first portion to said hook at said vertical axis, and includes a guide way extending along the length of said second portion thereof;

said second arm extends from said ring at the upper right outward to the right from said axis; and said body includes a guide way that extends between the juncture of said first arm and said second arm.

13. A trucker's knot according to claim 12 in combination with a tie-down rope wherein:

said hook on the outer end of said first arm engages and hooks over said rope said rope extends from said hook along said arm at a first angle to said loop and engages and extends into a notch at the inner end of said arm at said loop, then extends across the back of said body and into a notch at the right side of said body and across said second arm and forming a loop extending through said loop of said body for securing to a truck bed or the like.

* * * * *